US008589249B2

(12) United States Patent
Campbell

(10) Patent No.: US 8,589,249 B2
(45) Date of Patent: Nov. 19, 2013

(54) DYNAMIC LOAD ADJUSTMENT FOR ONLINE AUCTION BIDDING

(75) Inventor: Tom Campbell, Bellevue, WA (US)

(73) Assignee: Esnipe, Inc., Bellevue, MA (US)

( * ) Notice: Subject to any disclaimer, the term of this patent is extended or adjusted under 35 U.S.C. 154(b) by 857 days.

(21) Appl. No.: 11/679,125

(22) Filed: Feb. 26, 2007

(65) Prior Publication Data

US 2007/0276747 A1 Nov. 29, 2007

Related U.S. Application Data

(60) Provisional application No. 60/777,950, filed on Feb. 28, 2006.

(51) Int. Cl.
*G06Q 30/00* (2012.01)

(52) U.S. Cl.
USPC .............................. 705/26.3; 705/37; 705/35

(58) Field of Classification Search
USPC ..................................................... 705/26, 37
See application file for complete search history.

(56) References Cited

U.S. PATENT DOCUMENTS

| | | | | |
|---|---|---|---|---|
| 2002/0038282 | A1 | 3/2002 | Montgomery | |
| 2002/0075883 | A1 * | 6/2002 | Dell et al. | 370/413 |
| 2002/0085578 | A1 * | 7/2002 | Dell et al. | 370/422 |
| 2002/0188545 | A1 * | 12/2002 | Wiesehuegel et al. | 705/37 |
| 2005/0080707 | A1 * | 4/2005 | Glasspool | 705/37 |

OTHER PUBLICATIONS

Huang, Po-Hsian; "The Segment Approach Time Axis Algorithm for Proxy Bidding Application in Online Auction" 10th WSEAS Int. Conf. on Mathematical Methods and Computational Techniques in Electrical Engineering (MMACTEE'08), Sofia, Bulgaria, May 2-4, 2008 (http://www.wseas.us/e-library/conferences/2008/sofia/MMACTEE/mm-8.pdf).*

* cited by examiner

*Primary Examiner* — Ryan D Donlon
*Assistant Examiner* — Asha Puttaiah
(74) *Attorney, Agent, or Firm* — Strategic Patents, P.C.

(57) ABSTRACT

An automated bid proxy for online auctions transmits user-initiated bids to an online auction facility using dynamically adjusted bid times that vary from the user-specified or auction-specified bid times. This dynamic adjustment may advantageously distribute large bid loads over a time interval in order to reduce the peak load that is actually experienced by the automated bid proxy at times of high bid volume.

11 Claims, 8 Drawing Sheets

200

| BID_ID | AUCTION_ID | AUCTION_END | BID_TIME |
|---|---|---|---|
| 3857 | 5685994 | 13:00:00 GMT | -1 |
| 3858 | 6998403 | 13:00:00 GMT | -1 |
| 3859 | 9825734 | 13:00:00 GMT | -1 |
| ... | ... | ... | ... |

300

600

| PERFECT_BID | BIN_COUNT |
|---|---|
| 12:59:59 GMT | 25 |
| 13:00:00 GMT | 1458 |
| 13:00:01 GMT | 13 |
| … | … |

700

| BID_ID |
|---|
| 5748 |
| 5775 |
| 5779 |
| … |

900

| AUCTION_ID | PERFECT_BID | OFFSET_S | STAGGER_MS |
|---|---|---|---|
| 5685994 | 12:59:59 GMT | 0 | 0 |
| 6998403 | 12:59:59 GMT | 0 | 10 |
| 9825734 | 12:59:59 GMT | 0 | 20 |
| … | … | … | … |
| 7465929 | 12:59:59 GMT | 0 | 990 |
| 9324885 | 12:59:59 GMT | -1 | 0 |
| 4835809 | 12:59:59 GMT | -1 | 10 |
| 9458603 | 12:59:59 GMT | -1 | 20 |
| … | … | … | … |
| 0234024 | 12:59:59 GMT | -1 | 990 |
| 2034986 | 12:59:59 GMT | -2 | 0 |
| 9234985 | 12:59:59 GMT | -2 | 10 |
| 2394858 | 12:59:59 GMT | -2 | 20 |
| … | … | … | … |

Fig. 9

DYNAMIC LOAD ADJUSTMENT FOR ONLINE AUCTION BIDDING

RELATED APPLICATIONS

This application claims the benefit of U.S. Provisional Pat. App. No. 60/777,950, filed Feb. 28, 2006, the contents of which are hereby incorporated by reference in their entirety.

BACKGROUND

1. Field:

The invention relates to electronic commerce, and more particularly to an automated bid proxy for participating in online auctions.

2. Description of the Related Art

Online auctions provide a convenient medium for sale and resale of goods and services, and have grown rapidly in popularity. As popularity has grown, auction participants have become savvier about the competitive bidding process. For example, the technique of "sniping" has emerged, in which a participant places a single, last-minute (or last-second) bid. This technique aims to achieve tactical advantage by avoiding price run-ups that might result from numerous bidders who constantly seek to outbid one another.

In order to facilitate sniping, online services such as esnipe.com provide automated bid proxies that, automatically and under the control of a computer, place bids on behalf of users who wish to employ the technique of sniping. In practice, users have found that it is advantageous to use such automated bid proxies. This has led both to increasing demand for online services such as esnipe.com and to increasing load on the automated bid proxies provided by such online services.

Another development in the field of online auctions relates to a business practice of eBay, Inc. and its subsidiaries (hereinafter "EBAY®," which is a registered trademark of eBay, Inc.), the leading online auction venue in the United States. This business practice tends to arrange the end times of numerous auctions so that they coincide. This coincident finish of numerous auctions can place tremendous load on an automated bid proxy that is attempting to place last-second bids in the auctions.

Unfortunately, the popularity of automated bid proxies combined with the aforementioned business practice of EBAY® can cause the load on an automated bid proxy to spike in the seconds leading up to the coincident close of auctions. Indeed, in these circumstances the automated bid proxy may become overloaded, which may cause some bids to be placed too late such as after the end of an auction.

There remains a need for an automated bid proxy that can predict and compensate for changes in load.

SUMMARY OF THE INVENTION

An automated bid proxy for online auctions transmits user-initiated bids to an online auction facility using dynamically adjusted bid times that vary from the user-specified or auction-specified bid times. This dynamic adjustment may advantageously distribute large bid loads over a time interval in order to reduce the peak load that is actually experienced by the automated bid proxy at times of high bid volume.

These and other systems, methods, objects, features, and advantages of the present invention will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The foregoing and other objects and advantages of the invention will be appreciated more fully from the following further description thereof, with reference to the accompanying drawings wherein:

FIG. 9 depicts an adjusted bid table data structure.

DETAILED DESCRIPTION

Embodiments of the invention are described below. As described, an embodiment relies on the instantiation of numerous, single-threaded computer processes. It is widely known that instantiating a computer process generally consumes considerably more computing resources than an alternate method: creating a thread of execution within a computer process. However, it is also widely known that debugging or understanding the behavior a multi-threaded computer process can be considerably more difficult than debugging or understanding a single-threaded computer process. Thus, those skilled in the art will appreciate that a multi-threaded implementation of the instant invention, as compared with an embodiment, might provide both particular advantages with respect to system performance and particular disadvantages with respect to developing and understanding the implementation of the invention. The following description is directed generally to a single-threaded implementation. However, it will be appreciated that the systems and methods described herein are expressly intended to encompass both single-threaded and multi-threaded implementations, as well as other implementations that will be appreciated from the following example embodiments thereof.

It will be appreciated that the techniques described herein may have wider applicability, such as to other systems where an automatic, last-minute or last-second bid or action is desirable, such as computerized trading in equities, derivatives, or other financial instruments.

In general, embodiments of the present invention operate to reduce peak loads by distributing periods of high bid volume over greater time intervals. It will be understood that such distributing may usefully accommodate a wide range of peak volumes and time intervals. For example, embodiments may employ a maximum bid time displacement from an original, user-requested bid time. Additionally or alternatively, embodiments may distribute excess bids over time so as to limit the number of bids that will be initiated during a particular time interval. Further, such a bid-time redistribution methodology may smoothly or abruptly transition from unadjusted to adjusted bid times, and while specific adjustment algorithms are described herein, it will be understood that a variety of redistribution techniques including random, pseudo-random, Gaussian, priority queue, FIFO, LIFO, and other statistical or other techniques may be usefully employed with the systems and methods described herein. Thus, a variety of design and operational constraints may be accommodated according to, for example, a processing capacity of the automated bid proxy, a bandwidth or quality of a network connection, a response time (published or measured) of an auction facility, and any and all other relevant constraints. Any and all such variations are intended to fall within the scope of this disclosure.

Figures 1, 2:
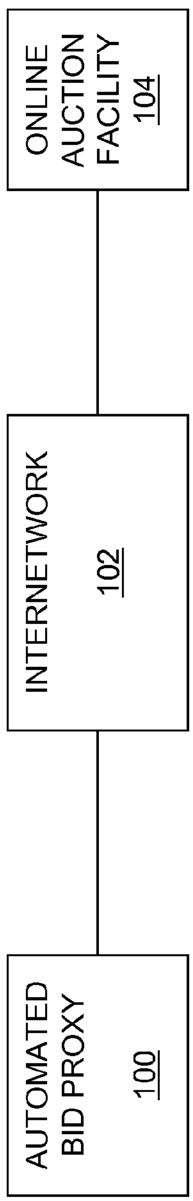
FIG. 1 depicts an embodiment of a system in which an automated bid proxy automatically places auction bids.
FIG. 2 shows a bid table data structure.

Referring now to FIG. 1, an embodiment of a system is shown. In this system, an automated bid proxy 100 may automatically place auction bids at an online auction facility 104. The automated bid proxy 100 may be operatively coupled to an internetwork 102, such as the Internet. The internetwork 102 may be operatively coupled to the online auction facility 104. These operative couplings may include network connections.

The network connections may be implemented according to the Internet Protocol Suite, which includes an Internet Protocol (IP) stack. The IP stack includes a link layer, an Internetwork layer, a transport layer, and an application layer. The link layer may include Ethernet, Wi-Fi, MPLS, and the like. The Internetwork layer may include the IP. The transport layer may include TCP, UDP, RTP, SCTP, and the like. The application layer may include HTTP, FTP, DNS, and the like.

The automated bid proxy 100 may include a server computer, such as a DELL™ POWEREDGE™ rack server (Dell and PowerEdge are trademarks of Dell, Inc.). The server may include a hard drive, RAM, CPU, and network interface of which the operative coupling between the automated bid proxy 100 and the internetwork 102 may be comprised. In embodiments, the automated bid proxy 100 may reside behind a firewall, and may include multiple server computers arranged in a clustered, replicated, or distributed configuration. The server may include an operating system, such as a variant of the UNIX® operating system (UNIX is a registered trademark of The Open Group).

The online auction facility 104 may include a server computer, such as a DELL™ POWEREDGE™ rack server. The server may include a hard drive, RAM, CPU, and a network interface including an operative coupling between the online auction facility 104 and the internetwork 102. In embodiments, the online auction facility 104 may further include a firewall and/or load balancer behind which the server computer may reside. The online auction facility 104 may include multiple server computers arranged in a clustered, replicated, or distributed configuration, or combinations of the foregoing. In an embodiment, the online auction facility 104 includes the Web systems of EBAY®. The online auction facility 104 may provide an online auction service in which an item may be provided for sale in an auction format, with bids accepted electronically via the internetwork 102. The auction may be identified by a unique auction identifier and may have an end time at which the auction closes.

In general, the automated bid proxy 100 may provide a user interface, such as a web server page accessible through the internetwork 102, through which users may configure bids for submission to the online auction facility 104. From time to time, the automated bid proxy 100 may transmit a signal, such as a data packet or set of data packets, to the online auction facility 104 via the internetwork 102. In an embodiment, the transmission of the signal is performed via the HTTP protocol over TCP/IP. The signal may include a bid for one or more items available for auction at the auction facility 104.

Referring now to FIG. 2, a bid table 200 may include entries relating the unique auction identifier (AUCTION_ID) of an auction, the end time of the auction (AUCTION_END), and a desired bid time (BID_TIME). The desired bid time may be expressed as a delta, in whole seconds, from the end time. Since the desired bid time must precede the end time of the auction, the desired bid time may be no greater than −1. The bid table 200 may be implemented in the automated bid proxy 100 as a flat file. The bid table may contain any number of rows, each of which may be representative of a future bid. In alternate embodiments, the bid table 200 may be implemented in the automated bid proxy 100 as an XML file, a table in a relational database, a data structure in the RAM of the server, and so forth. Also in alternate embodiments, some or all of the end times appearing in the bid table 200 may be offset by a constant or variable value from the actual end times of the auctions at the online auction facility 104. This offset may compensates for intrinsic lag or delays introduced by the automated bid proxy 100, the internetwork 102, and/or the online auction facility 104.

Figure 3:
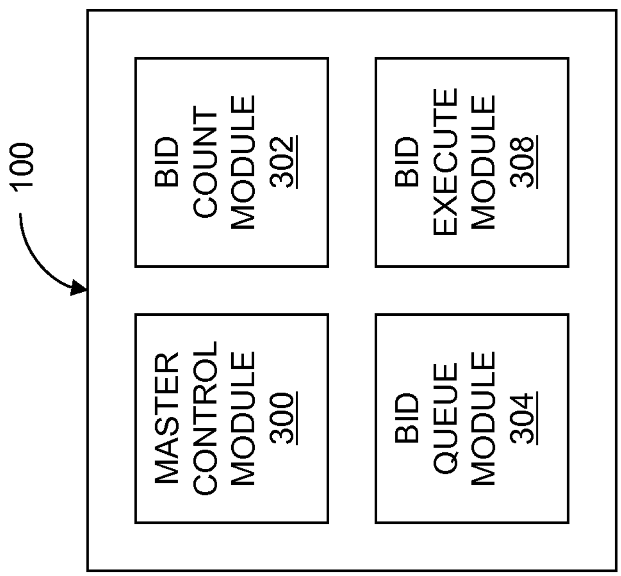
FIG. 3 depicts an embodiment of the automated bid proxy.

Referring now to FIG. 3, the automated bid proxy 100 may include a number of software modules, which may be implemented as computer programs and which may be instantiated as computer processes on the server of the automated bid proxy 100. These software modules may include a master control module 300, a bid count module 302, a bid queue module 304, and a bid execute module 308. When the automated bid proxy 100 is initially powered-up or started, an instance of the master control process 300 may be automatically instantiated. As will be appreciated from the following discussion, the instance of the master control process 300 may run at all times, while instances of the other modules 302, 304, 308 may run periodically or from time to time. A detailed example of operation of the master control process 300 is provided below with reference to Fig. A detailed example of operation of the bid count module 302 is provide below with reference to FIG. 5. A detailed example of operation of the bid queue module 304 is provided below with reference to FIG. 8. A detailed example of operation of the bid execute module 308 is provided below with reference to FIG. 12.

Figure 4:
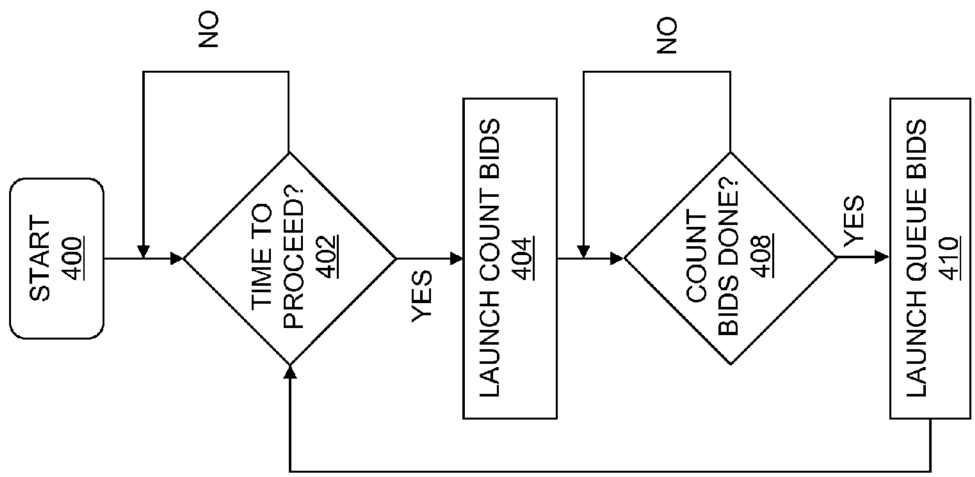
FIG. 4 depicts a logical flow diagram of a master control method for providing an automated bid proxy service.

Referring now to FIG. 4, a method of the master control module 300 may start at logical block START 400. From there, processing flow may continue to logical block 402, where a test may be conducted to determine whether it is time to dynamically adjust some of the bid times in the bid table 200. In an embodiment, the time to dynamically adjust some of the bid times occurs approximately every 45 seconds. If the result of the test at block 402 is negative, processing flow may return to logical block 402, where the test is repeated. Otherwise, processing flow may proceed to logical block LAUNCH COUNT BIDS 404. Here the bid count module 302 may be instantiated, yielding an instance of the bid count module 302. The instance of the bid count module 302 may operate for a finite amount of time and then exit. In the meantime and without delay, processing flow may continue to the logical block 408, where a test may be conducted to determine if the instance of the bid count module 302 has exited. If the result of this test is negative, processing flow may return to logical block 408, where this test may be repeated. Otherwise, processing flow may continue to logical block LAUNCH QUEUE BIDS 410. Here the bid queue module 304 may be instantiated, yielding an instance of the bid queue module 304. Having instantiated the bid queue module 304, processing flow may immediately return to logical block 402, from which the method of the master control module 300 may continue ad infinitum.

Figures 5, 6, 7:
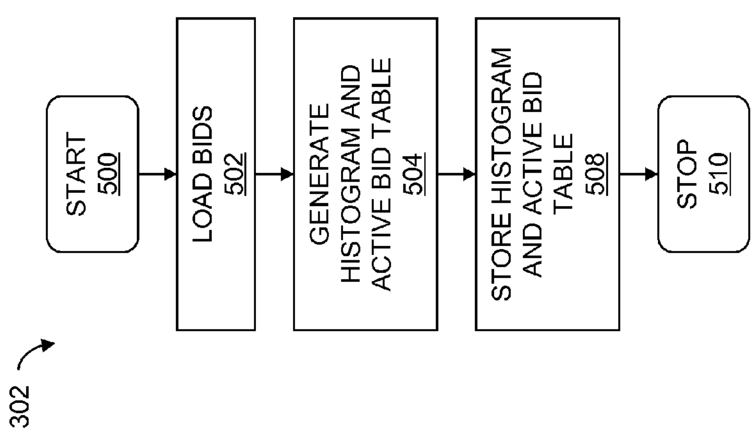
FIG. 5 depicts a logical flow diagram of a bid counting method.
FIG. 6 shows a histogram data structure.
FIG. 7 shows an active bid table data structure.

FIG. 5 shows a process for operating a bid count module. In general, the bid count module tracks bids that have been submitted to the bid proxy 100 in order to facilitate load balancing of the bid queue. Referring now to FIG. 5, a method of the bid count module 302 may start at logical block START 500. From there, processing flow may continue to logical block 502, where the bid table 200 may be loaded into a region of memory associated with and accessible to the instance of the bid count module 302. Then, processing flow may continue to logical block 504, where a histogram 600 and an active bid table 700 may be generated from the data in the bid table 200. An example embodiment of the histogram 600 is described in detail hereinafter with reference to FIG. 6. An example embodiment of the active bid table is described in detail hereinafter with reference to FIG. 7. Methods of generating the histogram 600 and the active bid table 700 will be apparent to those of skill in the art. Next, processing flow may continue to logical block STORE HISTOGRAM AND ACTIVE BID TABLE 508, where the histogram 600 and active bid table 700 may be stored in the automatic bid proxy 100 as one or more flat files on the hard disk. In alternate embodiments, the histogram 600 and/or active bid table 700 may be stored as one or more flat files in the RAM of the server of the automated bid proxy 100. In alternate embodiments, the histogram 600 and/or active bid table 700 may be stored in the automated bid proxy 100 as one or more XML files, two tables in a relational database, one or more data structures in the RAM of the server, and so forth, as well as various combinations of these. In any case, processing flow may then continue to logical block 510, where the method of bid count module 302 ends.

In an alternate embodiment, the bid table 200 may be managed by a relational database management system. In this case, the bid table 200 may not be loaded into a region of memory associated with the instance of the bid count module 302. Instead, the instance of the bid count module 302 may access the bid table 200 through the relational database management system (RDBMS), such as by issuing SQL queries to the RDBMS and receiving responses to those queries from the RDBMS.

It should be appreciated that references herein to uses of memory (such as loading something into or allocating a region of memory) should be broadly construed, and may include use of an RDBMS or other suitable alternative to random access memory for storing, retrieving, and/or modifying data, program states, and the like.

Referring now to FIG. 6, a histogram 600 may include rows relating a perfect bid time (PERFECT_BID) to a bin count (BIN_COUNT) of the number of future bids in the bid table 200 that are associated with the perfect bid time. The perfect bid time may represent the time at which a future bid would be executed, if it could be executed in perfect accordance with the values that define it in the bid table 200. The perfect bid time may be determined by adding an AUCTION_END value to its related BID_TIME value. PERFECT_BID may be a primary key.

In an embodiment, an approximately 45-second range of PERFECT_BID values may be included in the histogram 600. This range may be defined to be between 90 and 120 seconds in the future at the time that the histogram 600 is created. By defining the range in this way, the system may process a 45-second set of future bids, 90 to 120 seconds in advance of when the first bid in the set would, in a perfect world, be executed. The size of this range, 45 seconds, may define a corresponding period of the time to dynamically adjust bids as described above with reference to FIG. 4. Every bid in the bid table 200 that is associated with a PERFECT_BID value that is within the range may be represented in the histogram 600.

A bin count is a literal indication of the number of bids that would ideally be placed at a future time. Since placing a bid may impart some load on the automated bid proxy 100, the bin count may be a predictor of the load that might be on the automated bid proxy 100 at the future time. Thus, generally speaking, a predicted load on the automated bid proxy 100 may be proportional to a bin count in the histogram 600.

Referring now to FIG. 7, an active bid table 700 may contain a set of BID_ID values. These BID_ID values may be those of the bids that are represented in the histogram 600.

Figure 8:
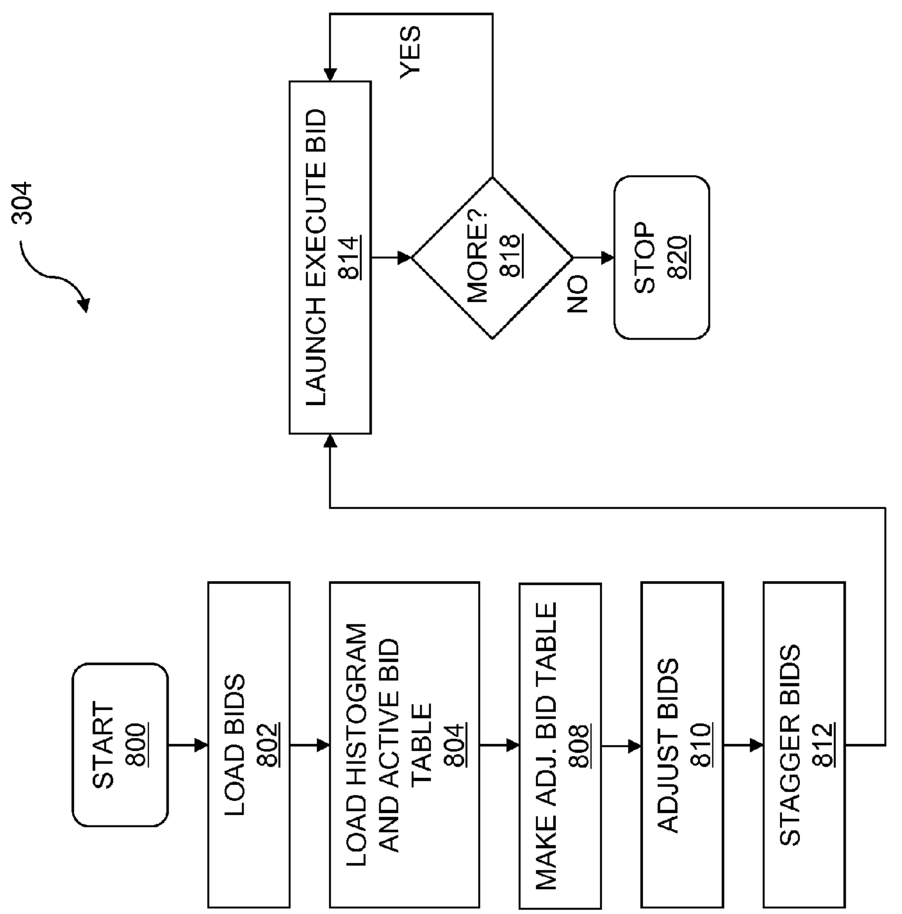
FIG. 8 depicts a logical flow diagram of a bid queuing method.

FIG. 8 shows a process for operating a bid queue module. In general, the bid queue module 304 operates to adjust bid times in order to distribute a plurality of coincident (or nearly or substantially coincident) bids over a time interval. As a significant advantage, this distribution may reduce load on either the automated bid proxy 100, the online auction facility 104, or both. As shown in FIG. 8, the method of the bid queue module 304 may start at logical control block START 800. From there, processing flow may continue to logical block LOAD BIDS 802, where the bid table 200 may be loaded into a region of memory associated with and accessible to the instance of the bid queue module 800. Next, processing flow may continue to logical block LOAD HISTOGRAM AND ACTIVE BID TABLE 804, where the histogram 600 and the active bid table 700 may be loaded into a region of memory associated with and accessible to the instance of the bid queue module 800. Then, processing flow may continue to logical block MAKE ADJUSTED BID TABLE 808, where a region of memory associated with and accessible to the instance of the bid queue process 800 may be allocated for the purposes of storing an adjusted bid table 900. An example of the adjusted bid table 900 is described in detail hereinafter with reference to FIG. 9. Processing flow may proceed to logical block ADJUST BIDS 810. Here a bid offset value may be calculated for each of the bids in the bid table 200 that is represented in the histogram 600. An example of the bid offset value is described in detail hereinafter with reference to FIG. 9. An example of a method for calculating the bid offset value is described in detail hereinafter with reference to FIG. 10. Next, processing flow may continue to logical block STAGGER BIDS 812, where a bid stagger value may be calculated. An example of the bid stagger value is described in detail hereinafter with reference to FIG. 9. An example of a method for calculating the bid stagger value is described in detail hereinafter with reference to FIG. 11. Next, processing flow may continue to logical block LAUNCH EXECUTE BID 814, where a BID_ID value in the active bid table 700 that has not already been associated with an instance of the bid execute module 308 may be associated with a new instance of the bid execute module 308. This instance of the bid execute module 308 may receive as parameters some or all of the values in the adjusted bid table 900 that may be associated with the BID_ID value. Processing flow may then proceeds to logical block 818, where a test may determine whether there is a BID_ID value in the active bid table 700 that has not been associated with an instance of the bid execute module 308. If the result of this test is affirmative, the process flow may return to logical block 814. Otherwise, the process flow may proceed to logical block STOP 820, where the process may end.

Referring now to FIG. 9, an adjusted bid table 900 may include entries relating the AUCTION_ID, the PERFECT_BID, the bid offset value (OFFSET_S), and the bid stagger value (STAGGER_MS). The bid offset value may be represented in whole seconds and the bid stagger value may be represented in whole milliseconds. The rows in the adjusted bid table 900 may be representative of the future bids contained in the active bid table 700. By default, all bid offset values and bid stagger values may initially be set to zero.

For pedagogical reasons, the rows of the adjusted bid table 900 are sorted both in ascending order based upon the bid stagger values in the STAGGER_MS fields and in descending order based upon the bid offset values in the OFFSET_S field. The bid offset method 1000 and the bid stagger method 1100, as described hereinafter with references to FIG. 10 and FIG. 11, uses data sorted in this order. However, one of ordinary skill in the art will appreciate that the rows of the adjusted bid table 900 need not be sorted, or may be sorted according to any ad hoc or other method, so long as appropriate modifications are applied to the bid offset method 1000 and/or the bid stagger method 1110. Thus, the particular arrangement of the rows in the adjusted bid table 900 and detailed descriptions of the bid offset method 1000 and the bid stagger 1100 method are provided for the purposes of illustration only, and should not be understood to limit the scope of the systems described herein.

The bid offset value may represent a delta between a perfect bid time and a realistically achievable bid time. The realistic bid time may be a time or an estimate of a time at which the automated bid proxy 100 may realistically be able to place an associated bid. The bid stagger value may represent a delta between the realistic bid time and the actual time at which the bid may be placed. When applied to the perfect bid times, the bid stagger values and the bid offset values have the effect of spreading the actual bid times both across seconds and within seconds. By spreading bids in this manner, the loads imposed on the automated bid proxy 100 (and on the online auction facility 104, for that matter) may be spread out over time, thus avoiding an overload condition that might otherwise develop.

Figure 10:
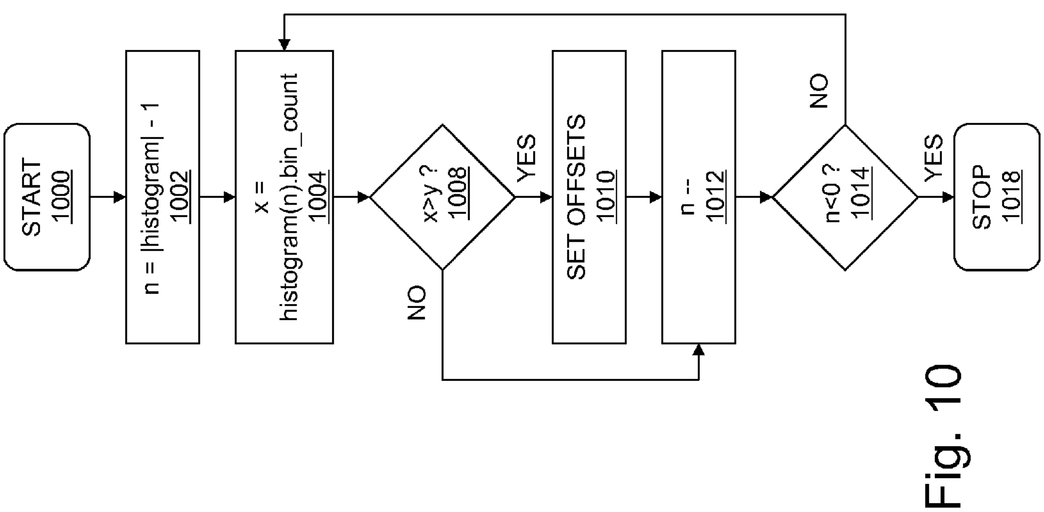
FIG. 10 depicts a method for calculating a bid offset value.

Referring to FIG. 10, a method for calculating the bid offset value is shown. This method modifies some or all of the bid offset values in the adjusted bid table 900 based on the contents of the histogram 600. The method may begin at the logical block START 1000. From there, processing flow may continue to logical block 1002, where a variable n may be set to the number of rows in the histogram 600 minus 1. Processing flow may continue to logical block 1004, where a variable x may be set to the count in of the $n^{th}$ row of the histogram. Then, processing flow may continue to logical block 1008, where a test may determine whether the value of x is greater than a value y. The value of y may represent a threshold above which an offset may be applied to some bids. In an embodiment, y may be 30. If the result of the test in logical block 1008 is affirmative, processing flow may proceed to logical block 1010. If not, processing flow may proceed to logical block 1012. At logical block 1010, bid offset values may be assigned to the bids that are represented in the $n^{th}$ row of the histogram 600. Each of these bid offset values may be written to a row in the adjusted bid table 900 that is associated with a bid that is represented in the $n^{th}$ row of the histogram, with one bid offset value being written to each of the represented bids. The bid offset values may be selected so that no more than q of the represented bids will have the same realistic bid time, where q may be a threshold value. In addition, the bid offset values may be selected so that the realistic bid times are as close to the perfect bid times as possible, without being later than the perfect bid times. In an embodiment q may be 300.

Figure 11:
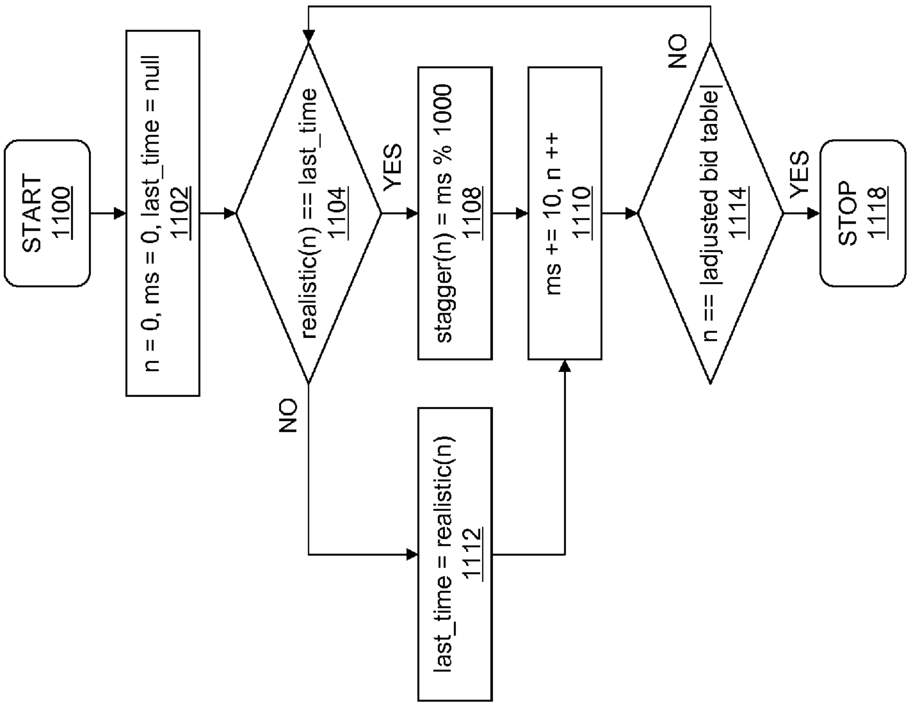
FIG. 11 depicts a method for calculating a bid stagger value.

Referring now to FIG. 11, a method for calculating the bid stagger value is shown. This method may modify some or all of the bid stagger values in the adjusted bid table 900 based on the contents of the adjusted bid table 900. The method may begin at the logical block START 1100. From there, processing flow may continue to logical block 1102, where a variable n is set to 0, a variable ms is set to 0, and a variable last_time is set to null. Next, processing flow may continue to logical block 1104, where a test may determine whether the realistic bid time of the bid represented by the $n^{th}$ row of the adjusted bid table 900 is equal to the value of last_time. If the result is negative, processing flow may proceed to logical block 1112, where last_time may be set to the realistic bid time of the bid represented by the $n^{th}$ row of the adjusted bid table 900. From here, processing flow may continue to logical block 1110. However, if the result of the test in logical block 1104 is affirmative, processing flow may proceed from there to logical block 1108. Here, the bid stagger value in the $n^{th}$ row of the adjusted bid table 900 may be set to ms modulo 1000. Next, processing flow may proceed to logical block 1110, where the value of ms may be increased by 10 and where n may be incremented. Processing flow may proceed to logical block 1114, where a test may determine whether n is equal to the number of rows in the adjusted bid table 900. If the result of the test is affirmative, processing flow may proceed to logical block 1118, where the method ends. Otherwise, processing flow may return to logical block 11104.

Figure 12:
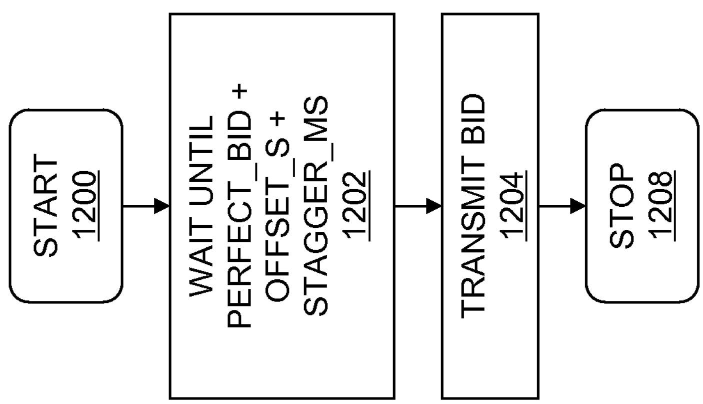
FIG. 12 depicts a logical flow diagram of a bid execution method.

FIG. 12 shows a bid execute module. In general, the bid execute module 308 operates to create bids for submission (e.g., through the internetwork 102) to an online auction facility. Although not explicitly described below, it will be understood that this may include any suitable data manipulation for traversing a network protocol stack or other communication system used to couple the automated bid proxy 100 and the online auction facility 104 in a communicating relationship. Referring now to FIG. 12, a method of the bid execute module 308 is shown. Recall that an instance of the bid execute module 308 may receive as parameters the values in the adjusted bid table 900 that are associated with a bid. In particular, the bid execute module may receive as parameters a unique auction identifier, a perfect bid time, a bid offset value, and a bid stagger value. The process may start at logical block 1200. From there, processing flow may continue to logical block 1202, where the method may wait until a time of day equals the perfect bid time plus the bid offset value plus the bid stagger value. Then, processing flow may proceed to logical block 1204, where a bid associated with the unique auction identifier may be transmitted to the online auction facility 104.

It will be appreciated that the timing of the bid may have been dynamically adjusted by the methods and systems described hereinabove. As a result, the peak load that is actually experienced by the automated bid proxy 100 may be less than it would have been had the timing of the bid not been dynamically adjusted.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A computer program product embodied in a non-transitory computer readable medium that, when executing on one or more computing devices, performs the steps of:

accessing a plurality of bids scheduled to execute from a bidding proxy over a predetermined time period, each having a bid time and a bid amount, at least two of the plurality of bids having an identical bid time;

calculating an offset for one of the plurality of bids having the identical bid time so that the number of bids at the identical bid time is below a predetermined threshold, thereby providing a second plurality of bids below the predetermined threshold at the identical bid time;

staggering the second plurality of bids according to a stagger to occur at a range of time increments around the identical bid time, thereby providing an adjusted bidding schedule within the predetermined time period for the plurality of bids, the adjusted bidding schedule providing adjusted bid times with at least one offset and at least one stagger for the plurality of bids; and executing the plurality of bids at the adjusted bid times.

2. The computer program product of claim 1, wherein the bids are bids in an online auction.

3. The computer program product of claim 1, wherein executing the bids includes transmitting the bids to an online auction facility.

4. The computer program product of claim 1, wherein executing the bids involves transmitting the bids over an internetwork.

5. The computer program product of claim 1 wherein adjusting the bids includes distributing the adjusted bid times to reduce a load.

6. The computer program product of claim 5, wherein the load is on an online auction facility.

7. The computer program product of claim 5, wherein the load is on an automated bid proxy.

8. A system, comprising:

a server computer comprising:

a central processing unit; and a plurality of software modules, which when processed by the central processing unit adapt the server computer into the automated bid proxy, the plurality of software modules stored within a non-transitory memory device of the server computer, the plurality of software modules comprising:

a bid count module that tracks a plurality of bids according to respective bid times, each one of the plurality of bids having a bid time;

a bid queue module that adjusts the bid times so as to maintain a number of bids have identical bid times below a predetermined threshold and to stagger one or more of the number of bids having identical bid times over a range of time increments;

a bid execute module that generates one or more bids for transmission to a remote online auction facility; and a master control module that coordinates operation of the bid count module, the bid queue module, and the bid execute module to generate one or more bids for submission to a remote online auction facility.

9. The system of claim 8, wherein the server computer comprises multiple server computers arranged in a clustered configuration.

10. The system of claim 8, wherein the server computer comprises multiple server computers arranged in a replicated configuration.

11. The system of claim 8, wherein the server computer comprises multiple server computers arranged in a distributed configuration.

* * * * *